United States Patent [19]

Maxwell, III

[11] 4,424,981
[45] Jan. 10, 1984

[54] HIGH STRENGTH LIGHT WEIGHT BIKE AXLE

[76] Inventor: William H. Maxwell, III, 22547 Decoro Dr., Saugus, Calif. 91350

[21] Appl. No.: 342,125

[22] Filed: Jan. 25, 1982

[51] Int. Cl.³ ............................................ B62K 25/02
[52] U.S. Cl. .................................. 280/288; 280/279; 301/105 B
[58] Field of Search ............................ 280/279, 288; 301/105 B

[56] References Cited

U.S. PATENT DOCUMENTS

| 612,401 | 10/1898 | Collmer | 310/105 B |
| 3,507,516 | 4/1970 | Fritz | 280/279 |
| 3,610,659 | 10/1971 | Gerarde | 280/279 |
| 3,922,018 | 11/1975 | Shook | 301/105 B |

FOREIGN PATENT DOCUMENTS

| 627137 | 9/1927 | France | 280/288 |
| 964759 | 8/1950 | France | 280/288 |
| 2300686 | 9/1976 | France | 301/105 B |
| 441107 | 10/1948 | Italy | 301/105 B |
| 178727 | 10/1935 | Switzerland | 280/288 |

*Primary Examiner*—Joseph F. Peters, Jr.
*Assistant Examiner*—Kenneth R. Rice
*Attorney, Agent, or Firm*—William H. Maxwell

[57] ABSTRACT

An axle assembly for the mounting of wheels in vehicle forks with a tensioning member over which inner pre-load nuts apply axial force to spaced bearings and characterized by shear sleeves transferring loads from the forks and into the inner pre-load nuts and tensioning member for support through inner races of the bearings, the shear sleeves closely coupling forces in shear and protecting threaded engagements enabling the use of light alloy parts of reduced configuration.

15 Claims, 13 Drawing Figures

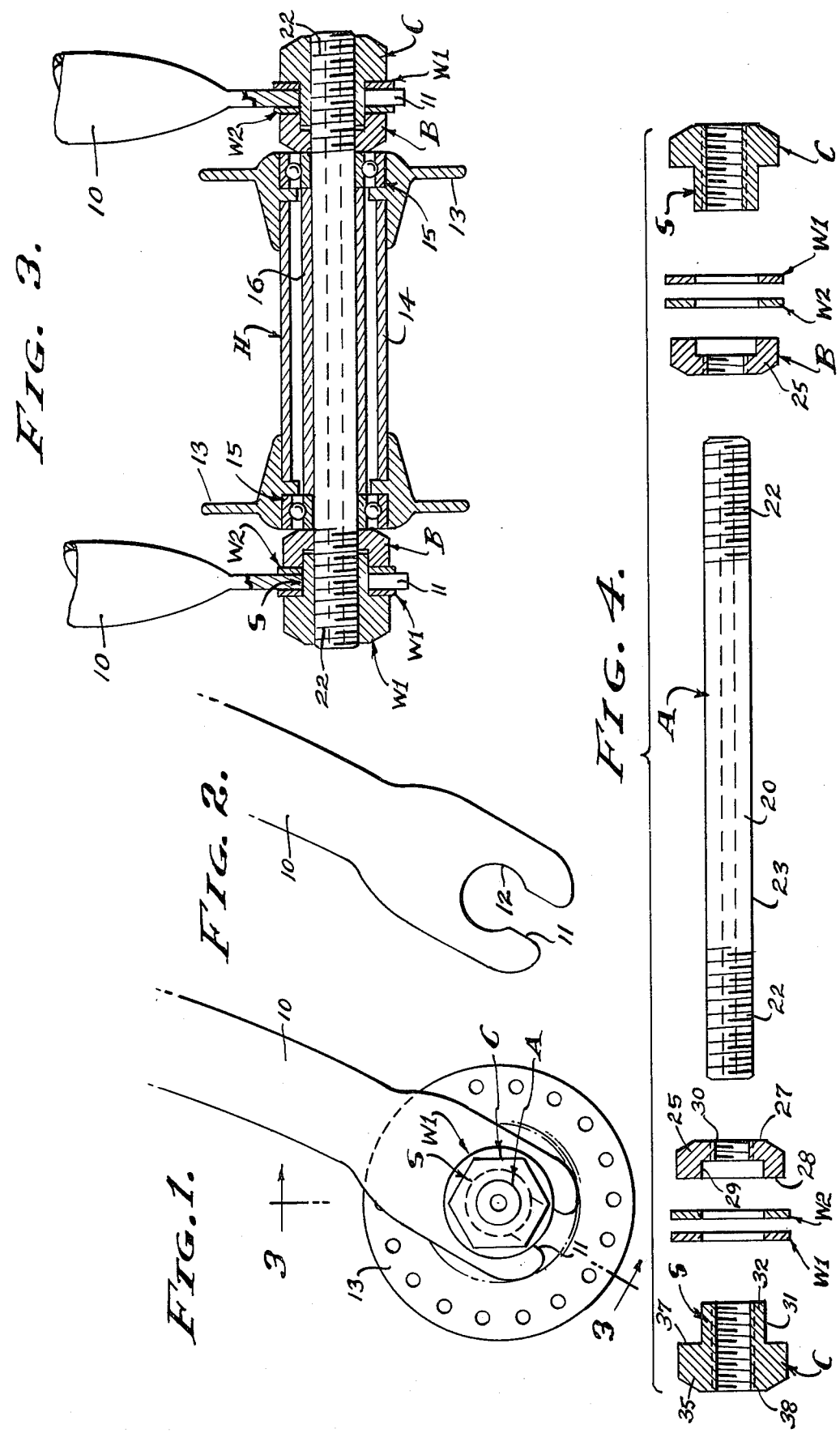

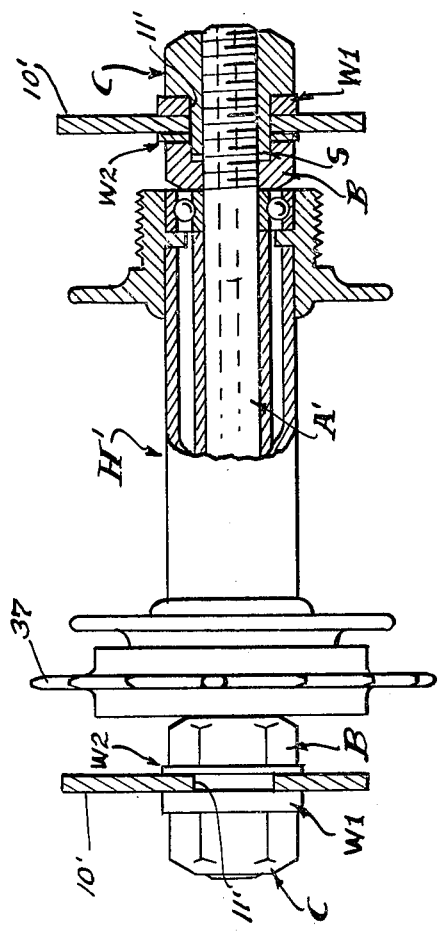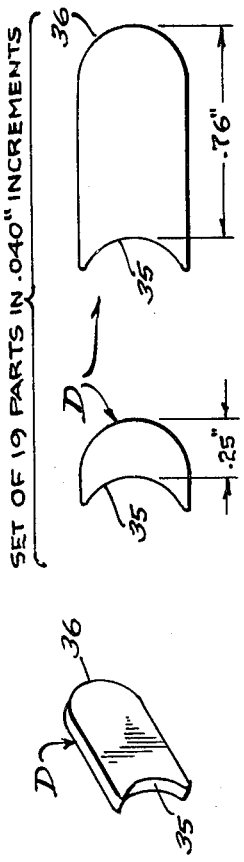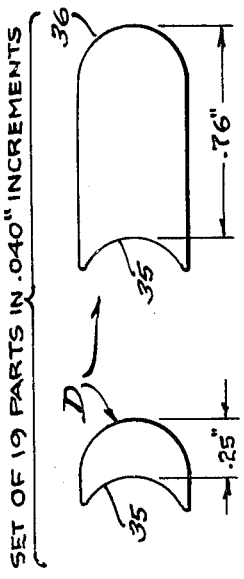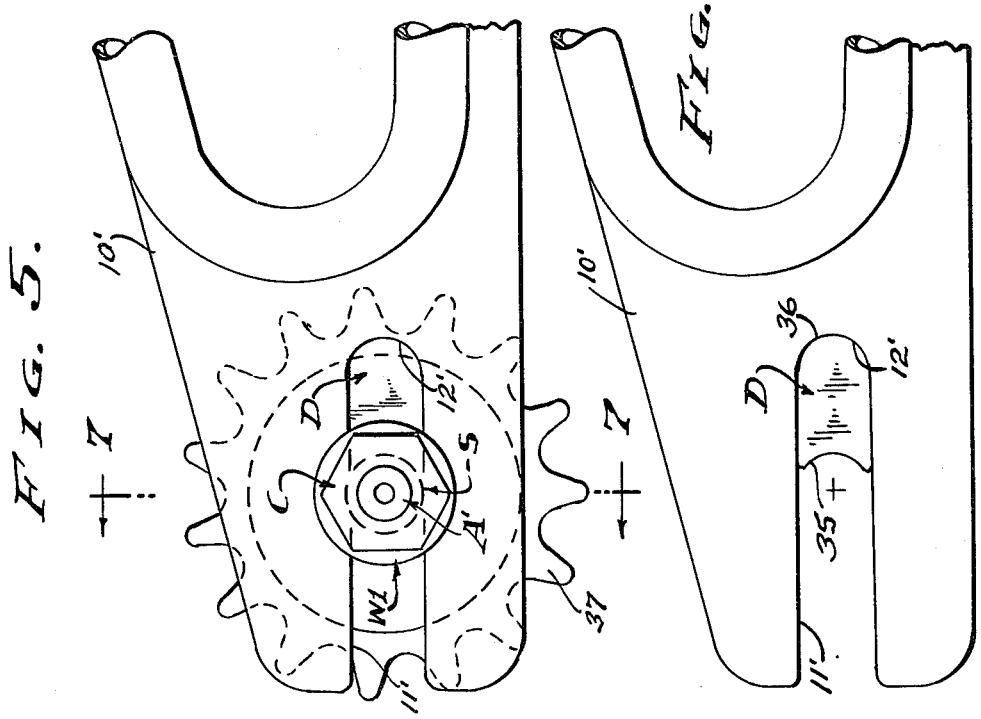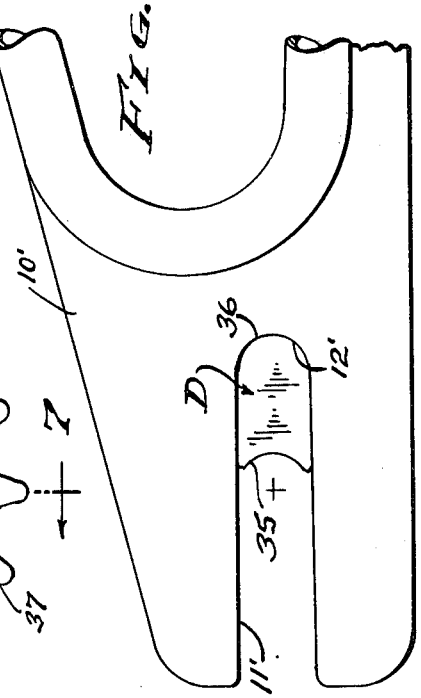

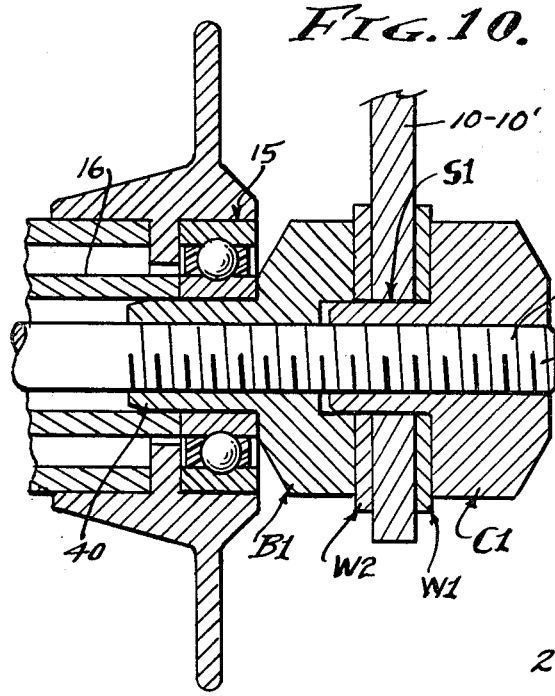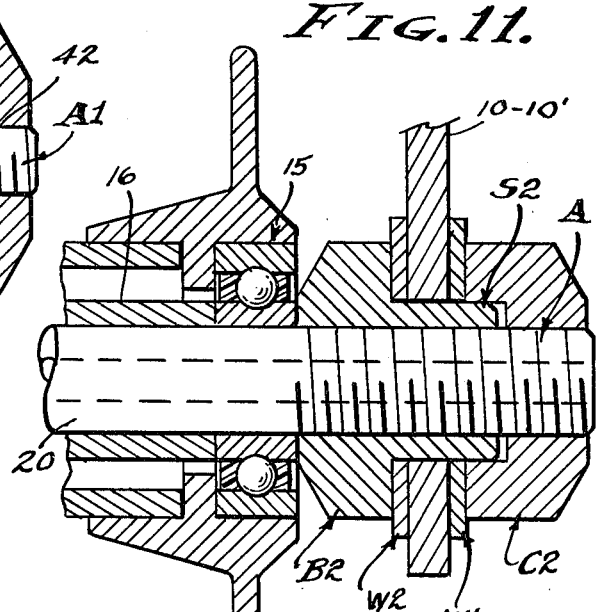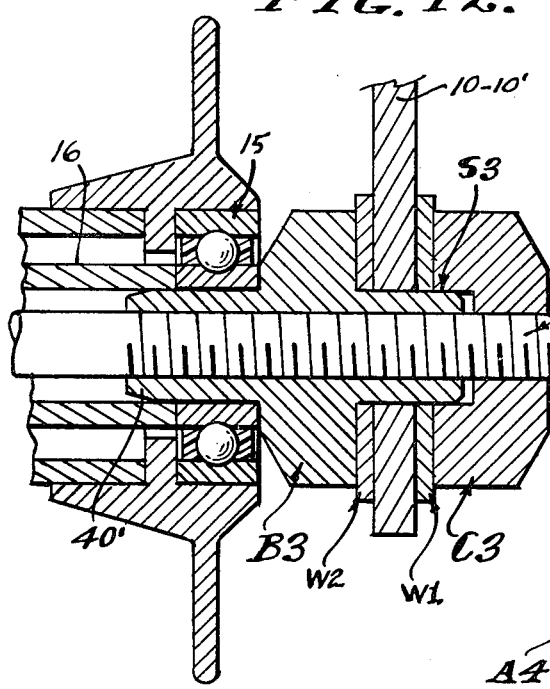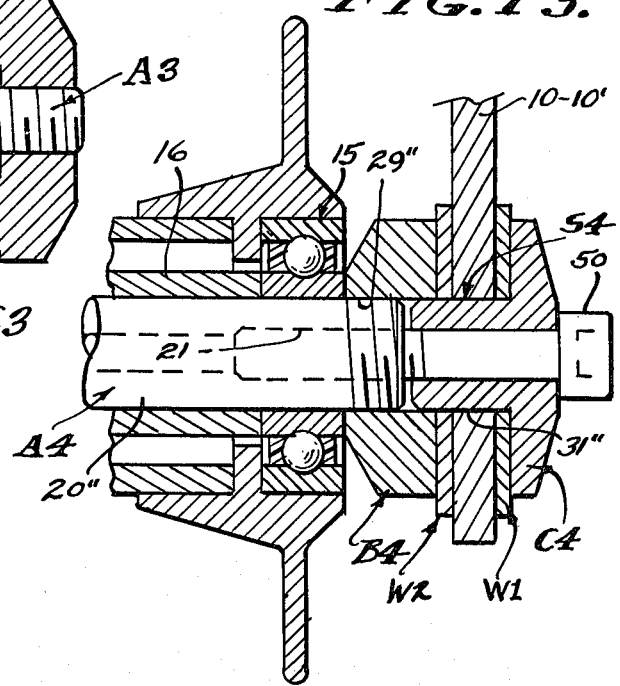

HIGH STRENGTH LIGHT WEIGHT BIKE AXLE

BACKGROUND

Competition bicycles and the like are stripped of weight as much as possible, and metals and other materials of low molecular weight are employed in the various components thereof. The front and rear hub assemblies are of particular concern, and these assemblies are among those components made of light weight metals such as aluminum, comprised of forged and turned parts of tubular configuration. A typical racing hub is illustrated in this disclosure, together with what I will term a "High Strength Light Weight Bike Axle" characterized by a tensioning member that pre-loads the anti-friction bearings through the application of inner nuts, and by mounting sleeves extending between said inner nuts and outer clamp members. The mounting sleeves are received by the forks of the bike frame, and the threads on the tensioning member are protected. It is a primary object of this invention to provide increased strength in a bike axle at the bearing engagement of the frame forks therewith, whereby light weight metals of reduced dimension can be employed to replace heavier metals of ordinary greater dimension.

Heretofore, heavy steel axles, washers and nuts have been relied upon for clamping bike hubs in their operating positions. This procedure applies to peddle powered bicycles and to motorcycles as well, as follows: The frame forks of the vehicles have been bifurcated for a loose fit, and the clamping force applied by the outer nut relied upon for positioning the hub in this placement of the axle. This loose fit concept of the axle within a fork slot induces bending of the axle, is subject to slipping, and it has required heavy construction using high strength metals such as carbon steels and the like. It is an object of this invention to provide a bearing or mounting member which can be fitted into a fork slot to accept shear forces, whereby bending moments transmitted into the axle tensioning member are reduced and substantially eliminated. With the present invention, the supporting loads of the vehicle are localized as shear loads between the forks of the vehicle frame and the mounting sleeves that I provide.

It is an object of this invention to transfer loads in shear through a sleeve, loads applied directly between the vehicle fork and hub bearing. In place of a "through-axle" per se, I provide the tensioning member that carries the inner nuts to pre-load the antifriction bearings. The tension member also threadedly receives the clamp member or screw fastener therefor, as the case may be. The mounting sleeve is carried by either the inner nut or outer clamp member and is stabilized when the clamp member is tightened; in shear with the fork and with the antifriction bearings.

It is also an object of this invention to prevent shifting of the rear axle assembly when subjected to severe strains, selective positioning blocks being provided to maintain axle assembly position at the rear forks.

SUMMARY OF INVENTION

In the first embodiment of FIGS. 1-9, the mounting sleeve is carried by the outer clamp member threaded onto a full diameter tensioning member in the form of a tubular shaft. The tensioning member is tubular for lightness and extends with a close fit into the inner race of the antifriction bearing for load transfer. There is a pre-load tube extending between opposite inner bearing races, the tubular shaft forming an extension of the inner nut so as to act in shear at the interface of the inner nut and inner bearing race.

In the second embodiment of FIG. 10, the mounting sleeve is carried by the outer clamp member, the same as in the first embodiment, and the tubular shaft is replaced by a tubular extension of the inner nut threaded onto the tensioning member in the form of a small diameter shaft for lightness.

In the third embodiment of FIG. 11, the mounting sleeve is carried by the inner nut, and the tubular shaft is employed as in the first embodiment.

In the fourth embodiment of FIG. 12, the mounting sleeve is carried by the inner nut as in the third embodiment, and there is a tubular extension of the inner nut fitted closely into the inner race of the antifriction bearing for load transfer.

And, in the fifth embodiment of FIG. 13, there is a tubular shaft as in the first embodiment to threadedly receive the pre-load nut, and the clamp member is secured by a cap-screw fastener threaded into the tubular shaft.

The foregoing and various other objects and features of this invention will be apparent and fully understood from the following detailed description of the typical preferred forms and applications thereof, throughout which description reference is made to the accompanying drawings.

DESCRIPTION OF THE DRAWINGS

FIG. 1 is a side view of a front bike fork and hub with the axle assembly of the present invention installed.

FIG. 2 is a view similar to FIG. 1 showing the front bike fork along with a modified slot.

FIG. 3 is a sectional view taken as indicated by line 3—3 on FIG. 1.

FIG. 4 is an exploded view of the parts which comprise the axle assembly.

FIG. 5 is a view similar to FIG. 1 showing a rear bike fork and hub with the axle assembly of the present invention installed.

FIG. 6 is a view similar to FIG. 5 showing the rear bike fork alone with a selected positioning block.

FIG. 7 is a sectional view taken as indicated by line 7—7 on FIG. 5.

FIG. 8 is a perspective view of the selected positioning block, and

FIG. 9 is an exploded view showing a typical range of block sizes that are provided.

FIGS. 10-13 are sectional views similar to one end of the axle assembly shown in FIG. 3, FIG. 10 showing a second and preferred embodiment of axle assembly, FIG. 11 a third embodiment, FIG. 12 a fourth embodiment, and FIG. 13 a fifth embodiment.

PREFERRED EMBODIMENT

This invention relates to bikes in general and especially to competition bicycles used in races by younger persons where the advantages of weight reduction are great. It is the conventional heavy steel axles that are to be replaced by the light weight assembly as it is disclosed herein, and all of which is made possible by a novel high strength combination of members comprising an axle assembly. With the assemblage of members as hereinafter described, the vehicle loads and impacts are taken in shear and closely coupled for minimizing bending moments. This axle assembly is applicable to both front and rear wheels (not shown) and involves an assembly of members as best illustrated in FIG. 4 of the drawings and comprising, a tensioning member A, a pre-load member B, a clamp member C, and a pair of clamp washers W1 and W2, the assembly being double ended as shown. All parts can be made of light weight metals and preferably various alloys of aluminum and of titanium, as will be described. In practice, any one of the alloys of aluminum are employed, including the 2000 series wherein the alloying element is of copper, the 3000 series alloy of manganese, the 4000 series alloy of silicon, the 5000 series alloy of magnesium, the 6000 series alloy of magnesium and silicon, and the 7000 series alloy of zinc, etc. These alloys are solution heat treated and aged to the T4 or T6 condition for strength and durability.

Referring now to the first embodiment and the front axle form thereof of FIGS. 1-4 of the drawings, the front forks 10 of the bike are conventional in every respect except for rework performed at the openings or slots 11 where the top end of the slot is enlarged at 12 to receive a shear sleeve S that protects the threads of the full diameter shaft, the tension member A, which extends through a hub H. This slot enlargement 12 prevents accidental withdrawal of the bike wheel even when operating with loose clamp members C. The hub H is of the sealed bearing type as it is shown herein, although conventional adjustable cone-type hubs (not shown) are equally applicable and in which case the bearing cones can be incorporated in the pre-load nuts B the same as they are disclosed herein. As best illustrated in FIG. 3 of the drawings, the hub H is comprised of a pair of flange members 13 spaced by a tubular housing 14 having spaced sealed antifriction bearings 15 with outer races inwardly seated in the flange members, and with inner races embracing an initially loose pre-load tube 16 extending therebetween. The inner diameter of the pre-load tube 16 is substantially the same as and for practical purposes identical to the inner diameters of the inner bearing races.

In accordance with this invention, the tensioning member A is made of a non-ferrous aluminum alloy tubing 20, or the like, with an inner bore and with external threads 22 rolled thereon to extend inwardly from opposite ends terminating immediately outside each inner race of bearings 15, respectively. The overall length of the tensioning member A is such as to extend through and to the outer faces of the opposite clamp members C later described. In practice, the aluminum tensioning member A is anodized so as to present a hardened outer diameter 23 to resist compression forces and thread wear.

The pre-load member B in the form of a nut is made of a non-ferrous alluminum alloy hex-stock 25, or the like, with flats and inner and outer faces 27 and 28 normal to a central axis. The nut has a threaded inner diameter to engage onto the threads 22 and has a counter bore 29 at its outer face 28 to receive the shear sleeve S, as will be described. The inner face 27 is recessed or chamfered at 30 to accommodate the ending of the threads 22, so that the full uninterrupted diameter 23 of the tensioning member A is in shear at the outer face of the inner bearing race, at opposite ends of the assembly. In practice, the aluminum pre-load nut B is anodized to present hardened flats and inner threads.

The characteristic feature of the present invention is the shear sleeve S that I provide to transfer loads from the fork slots 11-12 and into the antifriction bearings 15. The shear sleeve is made of a non-ferrous aluminum alloy or the like, and it fits closely to the outer diameter of the tensioning member A, and it is threaded thereto for this purpose. In practice, the outer diameter 31 of the shear sleeve S coextensively underlies the thickness of the fork 10 and adjacent washers W1 and W2 that embrace said fork. Another feature is the entry of the inner end 32 of the shear sleeve S into the aforesaid counter bore 29 in the pre-load nut B, so as to directly transfer loads from the shear sleeve and into said pre-load nut. The counter bore 29 is of a depth, and the end 32 positioned such that bottoming thereof does not occur when the clamp member C is tightened as next described. In practice, the aluminum shear sleeve S is anodized to present a hardened outer diameter and inner thread.

The clamp member C is made of a non-ferrous aluminum alloy hex-stock 35, or the like, with flats and inner and outer faces 37 and 38 normal to a central axis. The inner face 37 of the clamp member is adapted to be drawn into tight engagement with the outer washer W1 when the outer face 38 is flush with the end of the tensioning member A. In this first embodiment the shear sleeve S is integral with the clamp member C so that loads are transferred directly therefrom and into the tensioning member A as well as into the pre-load nut B as hereinafter described. Accordingly, the assembled combination of the tensioning member A, the pre-load nut B and clamp member C with the shear sleeve S cooperate to localize loads applied in shear therethrough and to transfer said loads directly to the antifriction bearing 15 through its inner race. Since the bike forks 10 are stiff structural members and the moment arm short between the forks 10 and bearings 15, there is little bending and all of which enables the use of light weight exotic alloys of reduced configuration.

The axle assembly installed as shown in FIG. 3 of the drawings is comprised of the parts and members thus far described, as follows: The tensioning member A is slideably engaged through the opposite end bearings 15, and through the pre-load tube 16 to center the same. The inner pre-load nuts B are then run onto the threads 22, one to the limit of thread 22 and the other tightened (usually by hand only) to a pre-load pressure against the inner races of bearings 15. The normal ends of pre-load tube 16 align the inner bearing races. The extended threaded ends of the tensioning member A are then passed through the slots 11 of forks 10, with the inner washers W2 in place to engage the flat inner sides of the forks; whereupon the clamp members C are run onto the threads 22 with the outer washers W1 in place to engage the flat outer sides of the forks. It is significant that the length and/or number of threads provided for tightening is approximately doubled, as compared with conventional nuts for this purpose, by virtue of the clamp member C and integral shear sleeve S combination. In practice, this front axle assembly employs anodized 6061-T6 washers W1 and W2 of relatively thin cross section as shown.

Referring now to the first embodiment and the rear axle form thereof of FIGS. 5-9 of the drawings, the rear forks 10' of the bike are conventional in every respect with unaltered slots 11' with concaved front endings 12'. The rear hub H' is essentially the same as the front hub H, differing only in the sprocket barrels and in the length required of the tensioning member A' so as to accommodate an increased length of the rear hub H'. However, when the clamp member C is relied upon solely for positioning the axle assembly, then the outer clamp washer W1 is made of thicker hard steel or the like, with a toothed or serrated inner face (not shown) to engage the outer side of the rear fork; the inner clamp washer W2 remaining the same as above described. Alternately, thin washers W1 and W2 are sufficient when installing the rear hub H' and axle assembly as shown in FIGS. 5 and 6 employing the selected positioning blocks D as next described and shown in FIGS. 8 and 9.

The blocks D are flat concavo-convex members provided to completely occupy the slot (11') space ahead of the shear sleeve S. Accordingly, the block D is made of a non-ferrous aluminum alloy having a thickness and a height commensurate with the thickness and height of the slot 11', and the block has a concave end 35 complementary to the shear sleeve diameter 31, and also has a convex end 36 complementary to the ending 12' of the slot 11'. In order to provide for drive chain (not shown) adjustment, the chain sprocket 37 is positioned by a pair of like blocks D, assuming that the frame and forks are aligned and symmetrical etc. Blocks D of different size are used to correct for any misalignment. In practice, a set of blocks D is provided or made available, to be selected according to length required for proper adjustment, for example a set of nineteen pairs of blocks in 0.04 inch increments and ranging to 0.76 inch. Such a set of blocks are anodized for durability and are adequate for a bicycle as shown.

Referring now to the second embodiment of FIG. 10 of the drawings, this embodiment of the axle assembly is substantially the same as the first embodiment hereinabove described, differing in the reduction in size and weight of the tensioning member A1, and in the addition of a shear tube 40 as an extension of the inner pre-load nut B1. In this form of the invention parts B1 and C1 can be and are shown as made of smaller cross sectioned hex stock, as the shear sleeve S1 passes into the slot of fork 10-10' without the enlargement thereof. In practice, the tensioning member A1 is smaller in diameter than the pre-load tube 16 leaving an annulus as shown, and made of a slender rod of non-ferrous aluminum alloy, or preferably of titanium, with external threads 42 rolled thereon to extend inwardly from opposite ends and terminating inwardly of each inner race of bearings 15, respectively. A feature of this embodiment is the aforesaid inward extension of the pre-load nut B1, in the form of the shear tube 40 that fits closely into and through the inner diameter bore of the inner bearing race of bearing 15 in each instance. The extended shear tube 40 is threaded onto the threads 42 reaching inwardly of the bearing races to enter into the pre-load tube 16 and thereby center the same between said inner bearing races. This second embodiment of the invention is assembled the same as the first embodiment and transfers shear loads in a closely coupled manner, all as above described.

Referring now to the third embodiment of FIG. 11 of the drawings, this embodiment of the axle assembly is substantially the same as the first embodiment hereinabove described, differing in a reversal of the member to which the shear sleeve S2 is made integral. It is to be understood that the shear sleeve S as first described can be a separate part, however in this third form of the invention the shear sleeve S2 is integral with the inner pre-load nut B2 so that loads are transferred in shear into the inner race of bearing 15 the same as from the tubular shaft or tubing 20 in the first embodiment above described. This third embodiment of the invention is assembled the same as the first embodiment and transfers shear loads in a closely coupled manner, all as above described.

Referring now to the fourth embodiment of FIG. 12 of the drawings, this embodiment of the axle assembly is substantially the same as the first embodiment hereinabove described, being an incorporation of the features found in the aforementioned second and third embodiments. This fourth form differs in the reduction in size and weight of the tensioning member A3, and in the addition of a shear sleeve tube 40' of the inner pre-load nut B3, and also in the shear sleeve S3 integral with said inner pre-load nut B3. This form of the invention has the advantages of the foregoing embodiments as they are hereinabove described, and is assembled the same as the first embodiment and transfers shear loads in a closely coupled manner, all as above described.

Referring now to the fifth and preferred embodiment of FIG. 13 of the drawings, this embodiment of the axle assembly is substantially the same as the first embodiment hereinabove described, differing only in the mode of applying the clamp member C4. In this form of the invention, the shaft or alloy tubing 20" terminates in the bore 29" in the inner pre-load nut B4, and the inner diameter bore 21 of the tensioning member A4 is threaded to receive a cap screw fastener 50 that draws the clamp member C4 into pressured engagement with the outer side of the fork 10 or 10' as the case may be. In practice, the shear sleeve S4 diameter 31" is the same diameter as the outer diameter of tubing 20", so that shear loads transferred at the fork slot into the clamp member C4 are in turn transferred in shear into the inner pre-load nut B4 and into the tensioning member A4 and bearing 15. This fifth embodiment of the invention is assembled the same as the first embodiment and transfers shear loads in a closely coupled manner, all as above described.

From the foregoing it will be understood how a durable light weight axle assembly for bikes is produced, employing as a characteristic feature the shear sleeve that transfers loads while protecting the threaded engagements. Thus, by close coupled transfer of loads in shear and by protecting the threaded engagements, the use of light weight softer metal alloys becomes feasible with great advantages to the vehicle rider.

Having described only the typical preferred forms and applications of my invention, I do not wish to be limited or restricted to the specific details herein set forth, but wish to reserve to myself any modifications or variations that may appear to those skilled in the art as set forth within the limits of the following claims.

I claim:

1. An axle assembly for mounting a wheel hub in the openings of spaced vehicle forks, said hub having a tubular housing with oppositely faced antifriction bearings spaced inwardly from the forks, and including in combination;

a tensioning member extending through the hub housing and projecting from the oppositely faced bearings, the opposite end portions of the tensioning member being threaded, a pre-load member at each opposite end of the assembly and threaded onto the end portions of the tensioning member to occupy the space between the antifriction bearings and the vehicle forks to engage and pre-load said bearings, a shear sleeve supportably extending through the fork opening at each opposite end of the assembly, and a clamp member at each opposite end of the assembly and fastened to the end portions of the tensioning member for clamping the opposite ends of the assembly to the vehicle forks, one of said members at each opposite end of the assembly being integral with the shear sleeve and the other of said members at each opposite end of the assembly having a counterbore receiving an end portion of the shear sleeve for load transfer in shear.

2. The axle assembly as set forth in claim 1, wherein the tensioning member is of an exterior diameter slideably entered through the antifriction bearings and with the opposite end portions thereof exteriorly threaded to receive the pre-load members and clamp members.

3. The axle assembly as set forth in claim 1, wherein the shear sleeves are integral with the clamp members to extend through the fork openings and enter the counterbores in the pre-load members.

4. The axle assembly as set forth in claim 1, wherein the tensioning member is of an exterior diameter slideably entered through the antifriction bearings and with the opposite end portions thereof exteriorly threaded to receive the pre-load nuts and clamp members, and wherein the shear sleeves are integral with the clamp members to extend through the fork openings and enter the counterbores in the pre-load members.

5. The axle assembly as set forth in claim 1, wherein the openings of the spaced vehicle forks are slotted to pass the tensioning member and the inner ends of the slots enlarged to the size of the shear sleeves to receive and capture the same.

6. The axle assembly as set forth in claim 1, wherein the shear sleeves are integral with the pre-load members to extend through the fork openings and enter the counterbores in the clamp members.

7. The axle assembly as set forth in claim 1, wherein the openings of the spaced vehicle forks are slotted to pass the shear sleeves for adjusted positioning of the axle assembly.

8. The axle assembly as set forth in claim 1, wherein the tensioning member is of an exterior diameter substantially smaller in diameter than the antifriction bearings with an annulus therebetween, and wherein a shear tube at each opposite end of the assembly is engaged over the tensioning member and enters into said annulus for load transfer in shear.

9. The axle assembly as set forth in claim 1, wherein the tensioning member is of an exterior diameter substantially smaller in diameter than and with the threads of opposite end portions thereof extended within the antifriction bearings with an annulus therebetween, and wherein a shear tube at each opposite end of the assembly is threadedly engaged over the threads of the tensioning member and enters into said annulus for load transfer.

10. The axle assembly as set forth in any one of claims 8 or 9, wherein the shear sleeves are integral with the clamp members to extend through the fork openings and enter the counterbores in the pre-load members.

11. The axle assembly as set forth in any one of claims 8 or 9, wherein the shear sleeves are integral with the pre-load members to extend through the fork openings and enter the counterbores in the clamp members.

12. The axle assembly as set forth in claim 1, wherein the tensioning member is of an exterior diameter slideably entered through the antifriction bearings and with the opposite end portions thereof exteriorly threaded to receive the pre-load members counterbored to receive the clamp members, wherein the shear sleeves are integral with the clamp members and extend through the fork openings to enter the counterbores in the pre-load members, and wherein each opposite end portion of the tensioning member is interiorly threaded to receive a screw fastener entered through the clamp member and sleeve to draw the same toward the pre-load members with the vehicle fork clamped therebetween.

13. The axle assembly as set forth in claim 12, wherein the tensioning member is a shaft with its threaded end portions terminating within the clamp members and spaced inwardly from the vehicle forks.

14. The axle assembly as set forth in claim 12, wherein the screw fastener at each opposite end portion of the tensioning member enters the interiorly threaded portion thereof and fully occupies said threaded interior portion coextensively within the antifriction bearing slideable thereover on the tensioning member.

15. The axle assembly as set forth in claim 12, wherein the screw fastener at each opposite end portion of the tensioning member enters the interiorly threaded portion thereof and fully occupies said threaded interior portion coextensively within the antifriction bearing slideable thereover on a non-threaded portion of the tensioning member.

* * * * *